United States Patent [19]

Tiethof

[11] 4,157,980

[45] Jun. 12, 1979

[54] HYDROSULFITE PREPARATION

[75] Inventor: Jack A. Tiethof, South Plainfield, N.J.

[73] Assignee: Engelhard Minerals & Chemicals Corporation, Edison, N.J.

[21] Appl. No.: 896,170

[22] Filed: Apr. 14, 1978

Related U.S. Application Data

[63] Continuation-in-part of Ser. No. 724,390, Sep. 17, 1976, abandoned.

[51] Int. Cl.$^2$ .............................................. C01B 17/66
[52] U.S. Cl. .................... 252/188; 423/265; 423/515
[58] Field of Search ............... 423/515, 265; 252/188

[56] References Cited

U.S. PATENT DOCUMENTS 791,675   6/1905   Descamps ........................ 423/515

FOREIGN PATENT DOCUMENTS 1007135  10/1965  United Kingdom.

OTHER PUBLICATIONS

Smith et al., "Pulp & Paper Mag., Canada, Proceeding of the Technical Section", D79-85 (1971).

*Primary Examiner*—Jack Cooper
*Attorney, Agent, or Firm*—Inez L. Moselle

[57] ABSTRACT

Aluminum metal is activated with hydrochloric acid and then reacted with an aqueous solution of sulfur dioxide to produce an aluminum hydrosulfite (dithionite) liquor useful for bleaching materials such as clay. The aluminum hydrosulfite can be converted to a sodium hydrosulfite liquor by precipitating aluminum with a sodium base.

10 Claims, No Drawings

HYDROSULFITE PREPARATION

RELATED APPLICATIONS

This is a continuation in-part of my co-pending application, Ser. No. 724,390, filed Sept. 17, 1976 now abandoned.

BACKGROUND OF THE INVENTION

This invention relates to the art of reducing sulfur dioxide in aqueous medium to form a metal hydrosulfite salt solution. In particular, the invention relates to the manufacture of aluminum hyrosulfite.

Hydrosulfites are commonly produced as aqueous solutions by a metal reduction of sulfur dioxide and/or salts thereof such as sulfite and bisulfites. Metals commonly used commercially are sodium (as mercury amalgams) and zinc (in the form of fine powders). Other metals, including iron and magnesium have also been suggested. Processes for converting zinc hydrosulfite liquors to sodium hydrosulfite are known.

Attempts have also been made to produce aluminum hydrosulfite bleach liquors. It has been demonstrated that aluminum hydrosulfite can be produced from aluminum powder and used as a bleach for paper pulp. Reference is made to a publication of G. W. Smith, et al, Can Pulp Mag., Proceedings Technical Section, D-79, 1971. The results reported in this publication strongly suggest that the aluminum route for manufacture of hydrosulfite would not be amenable for commercial exploitation. For example, in order to obtain the hydrosulfite it was necessary to use aluminum that had been alloyed with environmentally polluting mercury or to use magnesium, which is an expensive metal as the alloy constituent. When an alcoholic medium was employed for the reaction with the mercury-aluminum alloy, the yields based on metal content of the solution were low, and the over-all yield including unreacted metal, were very low, about 10 to 25%. In tests carried out with an aluminum alloyed with about 10% of magnesium, an aqueous reaction medium was used. In these tests, the alloy was first activated with dilute hydrochloric acid (0.6 M) and the dilute acid was used in substantial volume relative to the aluminum powder. Sulfur dioxide gas was then bubbled into the mixture of aluminum and hydrochloric acid and reaction was allowed to proceed for thirty minutes. The yield based on the aluminum consumed was about 70% and the authors postulated that the magnesium cations present in the system may have tended to stablize the hydrosulfite. Over-all yield was only about 25%. The consumption of sulfur dioxide, critical to the operation of a commercially feasible process, was not monitored in any of these experiments. For example, a process which would produce high yields based on the aluminum used or reacted would not be practical for a commercial operation if large excesses of sulfur dioxide would be necessary to secure the high yields.

British Pat. No. 1,007,135 to Goskar discloses a process for bleaching a slurry of iron-contaminated clay by a process in which the clay slurry is treated with an acidified bisulfite and passed through a bed of granulated zinc or magnesium, producing a hydrosulfite that is the bleach reagent. The British patent suggests that a second metal such as aluminum or copper can also be present, the second metal forming an electrocouple with the zinc or magnesium in order to improve the reduction of ferric iron. There was no attempt to produce a bleach liquor in which aluminum hydrosulfite was the sole hydrosulfite species.

To the best of my knowledge, aluminum hydrosulfite bleach liquors are not manufactured on a commercial basis in spite of the fact that it is known that aluminum on a weight basis is more effective as a reducing agent for sulfur dioxide than the metals that are now employed.

Accordingly, a general object of the invention is the provision of a simple, relatively inexpensive process for producing aluminum hydrosulfite liquors useful as a bleach for materials such as clay, which process represents a significant advance over prior art methods for producing aluminum hydrosulfite liquors. In particular, an object of the invention is to provide a method wherein the aluminum that is used does not have to be alloyed with an expensive metal such as magnesium or a polluting metal such as mercury and the yields are high based on both the metal that is reacted and the sulfur dioxide that is used.

THE INVENTION

I have found that aluminum metal in an effective reductant for sulfur dioxide in the presence of water provided that the activation of the aluminum metal is carried out in a specific and controlled manner hereinafter set forth. Once effectively activated in accordance with my invention, the aluminum metal will react with aqueous solutions of sulfur dioxide at low pH and near ambient temperatures producing an aluminum hydrosulfite liquor in significant yields. I also found the use of aluminum is advantageous as a metal reductant because the liquor can be used directly for bleaching materials such as clay without the need to precipitate aluminum with a base such as sodium hydroxide and convert the liquor to sodium hydrosulfite. In fact, aluminum hydrosulfite has been found to be a superior bleach for clay than the conventional sodium hydrosulfite.

The essence of my invention resides in activating aluminum metal by adding a concentrated solution of hydrochloric acid and limiting the amount of the concentrated acid solution to that which will totally wet the surface of the aluminum and form a slurry having a consistency suitable for mixing. The aluminum metal is maintained in contact with the concentrated acid solution until hydrogen evolution becomes vigorous. Once the aluminum has been sufficiently activated, as ascertained by rapid rate of hydrogen evolution, the slurry is immediately added to a cold solution of sulfur dioxide or the slurry should be cooled to suppress hydrogen evolution before being mixed with a cold solution of sulfur dioxide. After the sulfur dioxide solution is mixed with the slurried metal, the mixture is stirred vigorously and reaction between aluminum and sulfur dioxide proceeds exothermically. Means are provided to cool the reactants since the aluminum hydrosulfite reaction product will decompose at elevated temperature. Decomposition can be retarded sufficiently by maintaining the system at subambient temperature. Although in many cases the temperature of the slurry may rise initially to 20° C. or higher during metal reduction, continuous cooling is used to reduce the termperature to values in the range of about 0° to 10° C.

Significant yields of aluminum hydrosulfite are formed after a few minutes. Under the acidic conditions of the reaction, hydrosulfite will decompose even at reduced temperatures. Consequently, at temperatures in the range of 0°–10° C., yields are excellent but optimum reaction periods do exist. Typically, superior yields of aluminum hydrosulfite are achieved using 5–10 minute reaction periods.

After the reduction step, a neutralizing agent such as sodium hydroxide is added to increase the pH in order to retard decomposition of the aluminum hydrosulfite. Raising pH to a value in the range of about 3 to 4 is sufficient if the liquor is kept cold and is to be used after a short storage period. At this point, unreacted aluminum that settles out can be recovered using techniques such as filtration or decantation. Subsequent further addition of a base to the stabilized aluminum hydrosulfite liquor will cause aluminum hydroxide to precipitate. Still further base addition will cause the aluminum to redissolve in the liquor which now has very high pH and is relatively resistant to decomposition of hydrosulfite. If it is desired to remove most of the aluminum ions, the precipitate should be separated after the second phase of base addition as described above. The aluminum hydroxide can be separated for example, by centrifugation or filtration.

As mentioned above, an essential feature of my invention resides in activating aluminum metals by use of hydrochloric acid of high concentration and used in limited amount. Another essential feature resides in maintaining the aluminum in contact with the concentrated acid solution until vigorous evolution of hydrogen is observed. I have found that it is essential to activate aluminum in this manner in order to obtain high yields of aluminum hydrosulfite with effective utilization of sulfur dioxide.

When aluminum is activated with dilute hydrochloric acid, appreciably below 2 M HCl, such that the acid solution provides all the water needed for reaction with sulfur dioxide (as in the prior art mentioned above) the yields of aluminum hydrosulfite are significantly lower than those that are realized when practicing my invention. Further, is has been found that even when the hydrochloric acid is used as a concentrated solution and in sufficient amounts, if insufficient time is allowed for the acid to react with the aluminum at ambient temperature, and hydrogen evolution is not vigorous, the aluminum will be significantly less reactive to sulfur dioxide. I also found that a number of chemical agents well known to be capable of freeing the surface oxide coating from aluminum, do not produce the desired results. For example, hot acetic acid has been found to dissolve the oxide coating from aluminum and subsequent reaction with sulfur dioxide will yield hydrosulfite. However, it has been found that the yields will be significantly lower than those that are obtained when my invention is practiced. Caustic, sulfuric acid and hydrobromic acid can also be used to free the aluminum surface of the oxide coating. However, when aluminum was pretreated with either one of these reagents, causing vigorous hydrogen evolution to take place, the subsequent reaction with sulfur dioxide was very sluggish. The reason for this discrepancy is not obvious.

It is my present belief that process of the invention is effective because the concentrated hydrochloric acid that is used to activate the metal is a good coordinating agent for aluminum ion and that this assists in maintaining a clean metal surface throughout the subsequent sulfur dioxide reduction step since the metal is always in contact with a high concentration of chloride ions.

PREFERRED EMBODIMENTS

In practice of the invention, the aluminum metal that is used can be a metal that is free from mercury, magnesium, or other alloys. The particle size of the aluminum can be varied substantially while securing high yields of alumunum hydrosulfite. This is possible because relatively coarse grades of aluminum can be used in excess of the amount required to react with sulfur dioxide to compensate for the decreased reactivity of the relatively coarse aluminum. Unreacted metals can then be recovered from the aluminum hydrosulfite liquor after the first phase of base addition to stabilize the liquor. Using aluminum of relatively coarse particle size, for example, −18 to +60 mesh, I have obtained yields of aluminum hydrosulfite in the range of 50–70%, based on $SO_2$ and reacted Al, respectively. In tests using a five fold excess of aluminum, the yield was 66% based on $SO_2$ and 61% on reacted Al. With finer aluminum, such as commercial powders which are typically finer than 200 and 300 mesh, yields equal to or exceeding 70% based on $SO_2$ and reacted Al, were observed.

The hydrochloric acid solution employed to activate the aluminum metal can vary fairly widely in concentration, generally within the range of about 2 to 13 M. Concentrations of 4 to 6 M are preferred. In a suitable procedure, a concentrated hydrochloric acid solution, for example a 5 M HCL solution, is added to aluminum powder to completely submerge the sample and form a slurry that can be mixed. A suitable proportion is about 11 g. of aluminum powder to 11 ml of concentrated acid solution. Obviously, the amount of acid solution used must be such as to provide HCl in excess of the amount required to dissolve the surface coating on the aluminum. After the hydrochloric acid solution is added to the aluminum powder, the resulting slurry is maintained with occasional stirring until hydrogen evolution becomes fairly vigorous. The required contact time will vary with temperatures, degree of agitation and hydrochloric acid concentration. Generally, one to several minutes, for example, five minutes, at ambient temperature will suffice. With relatively dilute hydrochloric acid, for example, acid that is 2 M, activation time may be extended, but also the degree of activation as indicated by hydrosulfite yields will begin to decrease at low hydrochloric acid concentrations. Hydrochloric acid concentration appreciably above 6 molar can be effectively utilized as mentioned above. However, the cost of such acids is more significant and the activation is more difficult to control.

It is also a critical part of the subject invention that the aluminum be exposed to the activator prior to contact with an aqueous solution of sulfur dioxide. Once the aluminum metal has been sufficiently activated, as ascertained by a rapid rate of hydrogen evolution, the slurry should be immediately incorporated with and thoroughly mixed with a cooled sulfur dioxide solution. Alternatively, the slurry of activated metal can be cooled to suppress hydrogen evolution.

In practicing the invention on a batch scale, it may be more convenient to add aqueous sulfur dioxide solution to the slurry of activated aluminum metal rather than add the metal slurry to the solution of sulfur dioxide. Using either sequence, the mixture should be vigorously stirred. In continuous operation, it may be more feasible to reverse the sequence of addition of materials. Sulfur dioxide must be added as a cool aqueous solution, typically a solution at 20° C. or below and having a concentration of about 2 to 12% on a weight basis (2 to 12 parts by weight $SO_2$ to 100 parts by weight of solution). Preferably, the sulfur dioxide solution is one of fairly low concentration, for example, 6 to 8% because such solutions can be more effectively cooled than solutions of higher concentrations.

The relative amounts of $SO_2$ to Al that can be used can vary significantly from the 3 to 1 theoretical ratio. It is usually preferable to use aluminum in excess of this amount. The amount of aluminum used in excess of theoretical depends in part on the particle size of the aluminum used. For example, with 200 mesh aluminum powder, a 100% excess was found to be very suitable.

Following are illustrations of the practice of the instant invention using a fine aluminum powder. These examples are given for illustrative purposes only and the invention is not considered to be limited to the specific reaction conditions used.

These examples will show that the aluminum route to hydrosulfite (dithionite) manufacture is a highly efficient metal reduction process based on the economics of the chemicals required and that it has other advantages as well. In a zinc or iron reduction process, the metal ions must be removed for many applications, requiring extra costly process steps. Unlike these metal ions, aluminum is not a serious biological toxant nor does it detract from the functional properties of hydrosulfite in many of its applications. In fact, one of the illustrative examples will show that in bleaching kaolin clay, aluminum hydrosulfite liquor produced in accordance with the invention resulted in higher brightnesses than commerical sodium hydrosulfite or a sodium hydrosulfite prepared by converting an aluminum hydrosulfite liquor to sodium hydrosulfite.

All of the results achieved by practice of my invention as described hereinabove and set forth in the accompanying illustrative examples are based on analyses of hydrosulfite by titration with potassium ferricyanide. The ferricyanide tests were performed by titrating liquors directly into solutions of $K_3Fe(CN)_6$ (as a 3 to 6% solution in degassed water). The end point is a color change from orange to colorless or pale yellow. This titration involves the reaction of 2 moles of ferricyanide per mole of $S_2O_4^=$. Using this analytical technique it was found that by-products such as $S_2O_3^=$ did not interfere as they could if hydrosulfite had been analyzed by the standard iodine method (TAPPI Standard Procedure No. T622 os-68).

EXAMPLE 1

The metal reduction was run in a 1-liter, 5-neck flask utilizing a paddle stirrer, a gas inlet connected to a nitrogen-vacuum manifold, a 2-hole rubber stopper fitted with a pH electrode and a thermocouple, a 125 ml. addition funnel, and a 500 ml. addition funnel containing a cold aqueous $SO_2$ solution. A sample of aluminum powder (9.60 g., 0.356 moles of Alcoa No. 120) was placed in the flask and the flask was filled with pure nitrogen using the gas inlet. The powder is reported to have an average particle size slightly greater than 200 mesh (Tyler). Next a solution of HCl (11 ml. of 5.5 M) was added from the addition funnel to the reactor, covering the aluminum powder. In less than 1 minute hydrogen began to evolve and after 1.5 minutes it became rigorous. An additional 10 ml. of water was added and the bubbling was quenched by cooling the flask in a slush bath of dry ice-isopropanal. Then the $SO_2$ solution (34.2 g., 0.34 mole as an 8.00% solution) was added rapidly to the reactor and the reactor was stirred with continued cooling with the slush bath. (The solution of sulfur dioxide also containe 1.6 grams of NaOH, added as 5 ml. of aqueous solution, to neutralize unuse HCl.) The color of the reaction slurry became yellow and the temperature rose to 21° C. after 1 minute of mixing. This temperature was maintained for 30 seconds and decreased to 8° C. after a total of 3.5 minutes. After 5 minutes of mixing, the temperature was 2° C. and at this time caustic was added (10 ml. of a 25% solution), causing the yellow color to disappear as the pH was increased to 2.8. Additional caustic (5 ml.) was added, which increased the liquor pH to 3.5.

The cold liquor was analyzed for $S_2O_4^=$ content as follows. The liquor in a syringe was added below the surface of a solution of $K_3Fe(CN)_6$ (1.5 g. in 50 ml. of degassed water) with stirring. At the end point, the orange ferricyanide solution sharply changed to a near colorless solution.

The unreacted aluminum was recovered and washed with HCl (0.5 M), water and acetone and then it was dried; 4.98 g. of Al was recovered. The yield of aluminum hydrosulfite, from a duplicate analysis, was determined to be 70% based on $SO_2$ and 72% based on reacted aluminum. Essentially all of the reacted aluminum remained soluble in the liquor at the pH of 3.5.

EXAMPLE II

An experiment was performed in a manner identical to that in Example I, except that the aluminum used was that recovered from previous aluminum reduction experiments. The yield was determined to be 71% based on $SO_2$ and 69% based on reacted aluminum.

EXAMPLE III

Another experiment was performed in a manner identical to that in Example I except that no caustic was added initially to the $SO_2$ and only 11 ml. of caustic solution was added after the reduction to raise the pH to 3.5. This reduction was more exothermic. After 1 minute of reduction the temperature rose to 33° C. However, the temperature decreased with continued cooling to 17° C. after 3 minutes, to 9° C. after 4 minutes and to 0° C. after 5 minutes. The yield in this reaction was 77% based on $SO_2$ and 69% based on reacted aluminum.

EXAMPLE IV

A slurry of kaolin clay was bleached with aluminum hydrosulfite produced and described in Example III, or with a commercial sodium hydrosulfite containing 80% $Na_2S_2O_4$. The clay sample was slurried in water at 20% solids, and the pH adjusted to 2.5 to 2.8 with stirring using sulfuric acid. Next, a hydrosulfite solution was added and stirring was continued for 30 minutes. The pH was kept at 2.8–2.9 with sulfuric and a nitrogen atmosphere was maintained. The samples were then filtered and dried at 175° for one hour (to a free moisture of less than 1%). The samples were then pulverized and brightness measurements were recorded using a Carl Zeiss Elrepho brightness meter with a blue filter (effect wavelength 457 mn) and with MgO as the standard. Bleaching in the range of 2 to 8 lbs. per ton of clay produced higher brightness values with necessary bleach dosage. However, at higher dosages the brightness leveled off at maximum values. The aluminum hydrosulfite was more effected at each dosage and produced a maximum brightness which was ½ point higher than the clay bleached with the commercial hydrosulfite. The clay samples bleached with aluminum hydrosulfite also appeared to have superior rheological properties as indicated by Hercules and Brookfield rheograms.

In other tests an aluminum hydrosulfite produced as in Example III was coverted to sodium hydrosulfite and the precipitated aluminum was removed by filtration. The sodium hydrosulfite liquor thus prepared was comparable to commercial sodium hydrosulfite in bleaching the kaolin clay.

I claim:

1. A process for producing aluminum hydrosulfite liquor which comprises mixing particulate aluminum metal free from a mercury or magnesium alloy with an aqueous solution of hydrochloric acid having a concentration within the range of 2 M to 13 M and used in amount in excess of that required to dissolve the surface oxide coating on the aluminum, said amount of hydrochloric acid solution being limited to that which will totally wet the surface of said particulate aluminum and form a slurry capable of being mixed, maintaining said aluminum and said acid solution in contact until vigorous evolution of hydrogen gas occurs, thereby activating said aluminum metal, and without separating the aluminum metal from the acid solution, mixing the activated aluminum metal with an aqueous solution of sulfur dioxide of 2 to 12% concentration, said solution of sulfur dioxide being at a temperature of 20° C. or below and being used in relative proportion such as to provide in excess of 1 mole Al per 3 moles $SO_2$, and vigorously agitating said mixture for 5 to 10 minutes at a pH below 3, and at a temperature of 0° to 10° C., thereby producing aluminum hydrosulfite liquor.

2. The process of claim 1 wherein the sulfur dioxide solution is added while hydrogen is still evolving.

3. The process of claim 1 wherein unreacted aluminum metal is separated from said aluminum hydrosulfite liquor.

4. A process for producing aluminum hydrosulfite liquor which comprises slurrying particulate aluminum metal free from a mercury or magnesium alloy with an aqueous solution of hydrochloric acid having a concentration of 4 M to 6 M until hydrogen vigorously evolves, said aqueous solution of hydrochloric acid being used in amount in excess of that required to dissolve the surface oxide coating on the aluminum and being limited to that which will totally wet the surface of said aluminum and form a slurry having a consistency suitable for mixing, thereby activating said aluminum metal, immediately or after said slurry has been cooled, mixing said slurry with an aqueous solution of sulfur dioxide of 2 to 12% weight concentration that is at a temperature of 20° C. or below in amount such that the resulting mixture contains in excess of 1 mole Al per 3 moles $SO_2$, and vigorously agitating said mixture for 5 to 10 minutes at a pH below 3 at a temperature in the range of 0° to 10° C., thereby producing aluminum hydrosulfite liquor.

5. The process of claim 4 wherein immediately after aluminum hydrosulfite liquor is formed, the pH is increased to a value of at least 3, but below a value at which aluminum ions are precipitated so as to form stabilized aluminum hydrosulfite liquor.

6. The process of claim 4 wherein said aluminum metal is under an atmosphere of nitrogen prior to addition of said hydrochloric acid solution.

7. The process of claim 4 wherein, after hydrogen vigorously evolves therefrom, said slurry is cooled before being mixed with said aqueous solution of sulfur dioxide.

8. The process of claim 4 wherein unreacted aluminum metal is separated from said aluminum hydrosulfite liquor.

9. The process of claim 4 wherein said hydrochloric acid solution is mixed with said aluminum metal in relative proportion of about 1 ml. acid solution to 1 g. metal.

10. The process of claim 9 wherein additional water is added to said mixture of hydrochloric acid and aluminum metal after hydrogen evolution becomes vigorous and the resulting mixture is cooled to suppress hydrogen evolution before being mixed with said solution of sulfur dioxide.

* * * * *